United States Patent
Mercat et al.

(10) Patent No.: US 8,820,851 B2
(45) Date of Patent: Sep. 2, 2014

(54) TIRE FOR A CYCLE AND A CYCLE WHEEL COMPRISING A RIM AND SUCH TIRE

(75) Inventors: Jean-Pierre Mercat, Chavanod (FR); Olivier Mouzin, Montmin (FR)

(73) Assignee: Mavic SAS, Metz-Tessy (FR)

( * ) Notice: Subject to any disclaimer, the term of this patent is extended or adjusted under 35 U.S.C. 154(b) by 303 days.

(21) Appl. No.: 12/828,534

(22) Filed: Jul. 1, 2010

(65) Prior Publication Data
US 2011/0001349 A1 Jan. 6, 2011

(30) Foreign Application Priority Data
Jul. 2, 2009 (FR) .................................... 09 03295

(51) Int. Cl.
*B60B 21/02* (2006.01)
*B60C 5/00* (2006.01)
*B60C 19/00* (2006.01)

(52) U.S. Cl.
USPC ................... 301/95.104; 152/454; 152/380

(58) Field of Classification Search
USPC ............ 152/209.11, 192, 193, 194, 453, 454,
152/331.1, 339.1, 514, 515, 523, 375,
152/379.3, 380, 381.3; 301/95.101, 95.104
See application file for complete search history.

(56) References Cited

U.S. PATENT DOCUMENTS

| | | | | |
|---|---|---|---|---|
| 472,341 A | * | 4/1892 | Douglas | 152/397 |
| 504,284 A | * | 8/1893 | Smith et al. | 152/380 |
| 529,001 A | * | 11/1894 | Verdon | 152/375 |
| 590,503 A | * | 9/1897 | Taylor | 152/193 |
| 600,162 A | * | 3/1898 | Morris | 152/380 |
| 680,255 A | * | 8/1901 | Liberthal | 152/278 |
| 1,057,398 A | * | 4/1913 | Allison | 152/379.3 |
| 1,316,333 A | * | 9/1919 | Roussotte | 301/37.23 |
| 1,395,770 A | | 11/1921 | Rector | |
| 2,963,326 A | | 12/1960 | Wood | |

(Continued)

FOREIGN PATENT DOCUMENTS

DE    71 779 A    11/1893
EP    0 648 620 A1    4/1995

(Continued)

OTHER PUBLICATIONS

U.S. Appl. No. 12/840,793 (Jean-Pierre Mercat et al.), filed Jul. 21, 2010.

*Primary Examiner* — Kip T Kotter
(74) *Attorney, Agent, or Firm* — Greenblum & Bernstein, P.L.C.

(57) ABSTRACT

A tire for a cycle having a substantially toroidal shape, the tire including a tread adapted to be in contact with the ground, a base adapted to be fixed on the peripheral portion of a cycle rim, and two sides connecting the tread and the base, a lip having a height h greater than twice its thickness e and projecting from the upper portion of each of the two sides, in the vicinity of the tread. The height of the lip is greater than 15% of the width S of the tire in an inflated state. The lips can be constituted by the non-attached extension of the tread and, in particular, by a ply of material affixed to the top of the tire and whose edges are left free on a height greater than 15% of the width of the tire, or each lip can be arranged on an intermediate element adhered on the sides and/or the base of the tire, the intermediate element being capable of being a ring including an annular channel open towards its periphery and two lips projecting from each side of the channel.

12 Claims, 5 Drawing Sheets

(56) References Cited

U.S. PATENT DOCUMENTS

| | | |
|---|---|---|
| 3,883,182 A | 5/1975 | Barnes |
| 4,327,793 A | 5/1982 | Wyman et al. |
| 4,436,128 A * | 3/1984 | Pointer .................... 152/209.11 |
| 5,061,013 A | 10/1991 | Hed et al. |
| 6,443,201 B1 * | 9/2002 | Colantonio et al. .......... 152/454 |
| 7,562,685 B2 * | 7/2009 | Segawa et al. ............... 152/516 |
| 2007/0194619 A1 * | 8/2007 | Colegrove et al. ....... 301/95.101 |

FOREIGN PATENT DOCUMENTS

| | | |
|---|---|---|
| FR | 1 253 724 A | 2/1961 |
| FR | 2 555 106 A1 | 5/1985 |
| FR | 2 913 213 A1 | 9/2008 |
| JP | 2005059751 A * | 3/2005 |

* cited by examiner

TIRE FOR A CYCLE AND A CYCLE WHEEL COMPRISING A RIM AND SUCH TIRE

CROSS-REFERENCE TO RELATED APPLICATION

This application claims priority under 35 U.S.C. §119 of French Patent Application No. 09 03295, filed on Jul. 2, 2009, the disclosure of which is hereby incorporated by reference thereto in its entirety.

BACKGROUND

1. Field of the Invention

The present invention relates to a tire for a cycle, as well as to a cycle wheel comprising a rim and such tire.

2. Description of Background and Other Information

Cycle wheels are generally comprised of a rigid portion, i.e., the rim, on which an inflatable portion, i.e., the tire, is mounted. Two types of tires are commonly used for bicycle wheels; tubular tires and wire bead tires, the latter simply being commonly referred to as pneumatic tires, sometimes as clincher tires, or, simply, tires. The invention encompasses both of these tire types.

The amount of power a human being can generate is limited; therefore, the forward speed of a cyclist is limited. This speed results from a balance between the power developed by the cyclist and the forces opposing the advance, i.e., the forward motion. The opposing forces include, in particular, rolling resistance, which is a linear function of the speed and the aerodynamic resistance, and the drag, which is a function of speed squared.

The theory of aerodynamics teaches that the more laminar the air flow around the moving object, the lower the drag. For this reason, configurations that generate separation of the air-flow are sought to be avoided, or, in any case, configurations are sought that limit air-flow separation as much as possible.

In the case of a cycle wheel, in particular a spoked wheel, because of its annular characteristic and because the direction of its advance through air is within its plane of symmetry, the shape of the tire as well as that of the rim determine the aerodynamic drag on the wheel. Indeed, depending upon the direction of advance of the wheel with respect to front portion of the wheel, the tire constitutes the leading edge for penetration through the air, and the trailing edge is at the rim. Conversely, with respect to the rear portion of the wheel, the leading edge is at the rim and the trailing edge is at the tire.

Several manufacturers have proposed models of wheels which are claimed to reduce aerodynamic resistance. For example, the document U.S. Pat. No. 5,061,013 discloses a cycle wheel in which the ratio of the maximum width of the rim to the width of the tire is greater than 1. As another example, the document FR 2 555 106 discloses the positioning of a banding strip on a tire in order to center the tire on the rim and to reduce the aerodynamic penetration coefficient.

All such attempts have provided no satisfactory solution to the problem of reducing aerodynamic resistance. As will be seen hereinafter, the aerodynamic drag is often decreased for either the front or rear portion of the wheel, but not for both.

The rim disclosed in the document U.S. Pat. No. 5,061,013 does not comply with the standard of the ETRTO (European Tyre and Rim Technical Organization). In particular, this standard recommends that the recess of the rim not exceed 4.5 mm for a tubular rim. In the rim of this document, the rim recess is very substantial, which will necessarily have consequences either on the mounting of the tire or on maintaining the tire on the rim. Indeed, if the outer diameter is that of a standardized rim, the tire can be mounted easily; however, due to the substantial size of the recess, the tire, once mounted on the rim band, will be loose. If the diameter of the rim band corresponds to the ETRTO recommendations, it will certainly be very difficult, during assembly, to pass the tire over the flanges of the rim. In addition, the wheel obtained is not very comfortable insofar as, due to the substantial rim recess, the rim flange travel is reduced. A reduced rim flange travel multiplies the risks of puncture by crushing the tire and pinching the tube. To decrease this risk, the designer of the wheel disclosed in U.S. Pat. No. 5,061,013 chose to have thick and rounded upper rim edges. The thickness of the upper edges of the rim results in breaking the continuity of the outer surface of the wheel in the area of the tire/rim interface. This break of continuity is a source of disturbance in the air flow and therefore increases aerodynamic resistance. This is particularly the case for the rear portion of the wheel, i.e., whereby the leading edge is the rim and the tire is the trailing edge. Indeed, the width of the rim is much more substantial than that of the tire, which increases the frontal surface.

The document FR 2 555 106 proposes a banding strip to improve the connection of the edges of the rim to the tire. In this construction, the narrowing of the rim with respect to the tire has as the consequence that, with respect to the front portion of the wheel, the air-flow separation limit is between the zone of the greatest width of the tire and the rim, causing a disturbance in the flow along the side walls of the rim. The separation of the air-flow generates a strong depression in the vicinity of the maximum width of the tire, which increases the aerodynamic drag. In the zone of the banding strip, the air-flow is already separated, so that this zone has no effect on the decrease in the drag. Indeed, the wheel disclosed in this document has almost the same aerodynamic drag, with or without a banding strip. In addition, as described in this document, the banding strip comprises edge beads to provide consistency to the elastic or plastic material that forms the connection profile. Such a construction is relatively heavy because, in the case of a tube, it involves providing the tube with a reinforcing element that is typical of wire bead tires, and in the case of a wire bead tire, it involves doubling this reinforcing structure. Consequently, even if there were improvement to the aerodynamics, such would be to the detriment of the weight of the wheel.

SUMMARY

The present invention provides a bicycle wheel having low aerodynamic resistance, regardless of the angle of incidence of the apparent wind with respect to the direction of advance of the bicycle, and in particular when the angle of incidence ranges between 0° and 35°.

The invention also provides a bicycle wheel having a reduced risk of punctures associated with rim flange travel. That is, the amplitude of allowable radial deformation of the tire, to the point of completely being crushed by the rim, as the rim is forced to engage the ground, is maximum.

The invention also provides a lightweight bicycle wheel.

The invention also provides a wheel for which the tire, whether a tubular tire or a wire bead tire, is easy to mount.

The invention also provides a bicycle wheel that complies with the ETRTO recommendations.

To these ends, the invention is directed to a cycle wheel having an axis A and a diameter D, such wheel comprising a rim and a tire, the rim being comprised of a rotational body, the cross section of which comprises a main portion and a peripheral portion that is radially positioned outside of the main portion, and which comprises an annular cavity in which the tire is partially received; the outer surface of the wheel being comprised of the portions of the tire and of the rim facing outward of the wheel; the width of the main portion L being greater than the width S of the tire, when the latter is in an inflated state; a lip projecting from each of the two sides and having a height greater than 15% of the value S.

In a particular embodiment of the invention, the lip constitutes an intermediate portion of the outer surface of the wheel and extends substantially between an inner circle, having an axis A and a diameter D1, and an outer circle having an axis A and a diameter D2, the diameter D2 being greater than the value D decreased by four thirds of the value S: "D2>D−(4/3)×S".

In a particular embodiment of the invention, the inner diameter D1 of the lip is greater than the inner diameter D3 of the tire, i.e., an innermost diameter D3 of the tire.

In a particular embodiment of the invention, the cross-sectional profile of the lip is a curved portion whose radius of curvature is always greater than the value S.

The invention is also directed to a cycle tire having a substantially toroidal shape, the tire comprising a tread, adapted to be in contact with the ground; a base, adapted to be fixed on the peripheral portion of a cycle rim, and two sides connecting the tread and the base; a lip having a height h greater than twice its thickness e and projecting from each of the two sides.

In a particular embodiment of the invention, the height of the lip is greater than 15% of the width S of the tire when in an inflated state.

In a particular embodiment of the invention, the lip projects from the upper portion of the side, in the vicinity of the tread.

In a particular embodiment of the invention, an empty space is created between the upper surface of the rim, the inner surface of the, lip and the portion of the tire that is subjacent with the lip.

In an embodiment of the invention, the lips are constituted by the unattached extension of the tread and, in particular, by means of a ply of material adhered to the top of the tire, and the edges of which are left free on a height greater than 15% of the value S.

In another embodiment of the invention, the lip is arranged on an intermediate element adhered to the sides and/or the base of the tire, the intermediate element being capable of being a ring including an annular channel open towards its periphery, i.e., open radially outwardly, and two lips projecting from each side of the channel.

BRIEF DESCRIPTION OF THE DRAWINGS

Other characteristics and advantages of the invention will become apparent upon reading of the description that follows, with reference to the annexed drawings, which are given only by way of non-limiting examples, and in which.

DETAILED DESCRIPTION

Figure 1:
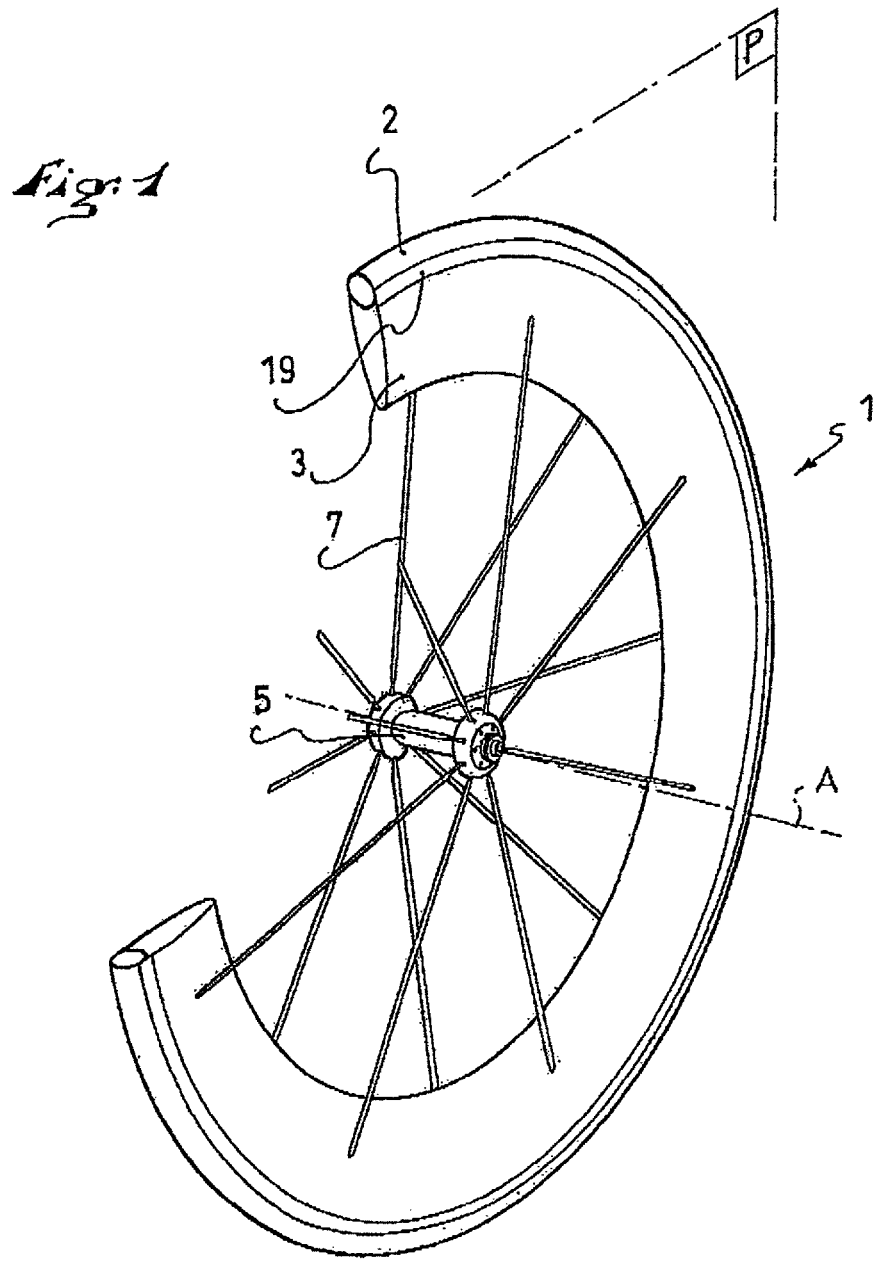
FIG. 1 is a perspective view of a wheel according to a first embodiment of the invention.

FIG. 1 provides a general view of a wheel 1 according to the invention. The wheel 1 includes a rim 3, a hub 5, and spokes 7 connecting the rim to the hub, the body of respective ones of the spokes extending between the rim and the hub being shown in FIG. 1. The wheel 1 has a rotational axis A, about of which it is rotates relative to the bicycle frame, and a symmetry plane P, perpendicular to the axis A. The total diameter D of the wheel, i.e., the outer diameter of the tire when mounted on the rim and inflated to the recommended pressure, ranges substantially between 600 and 680 millimeters (mm). By outer surface of the wheel is meant all of the portions of all of the components of the wheel facing outward of the wheel, including the bodies of the spokes, and which, consequently, are in contact with the air flow during use of the wheel. This includes, e.g., the surfaces of the tire 2 and rim 3 shown in FIG. 1, except for the interior surfaces thereof.

Although a spoked wheel is shown in FIG. 1, it is to be understood that the invention is not limited to a wheel of this type. Moreover, neither the types of spokes used nor their attachment to the rim and hub are discussed in detail herein.

The rim 3 is made by molding an annular body 40 of composite material comprised of carbon fibers, for example.

Figure 2:
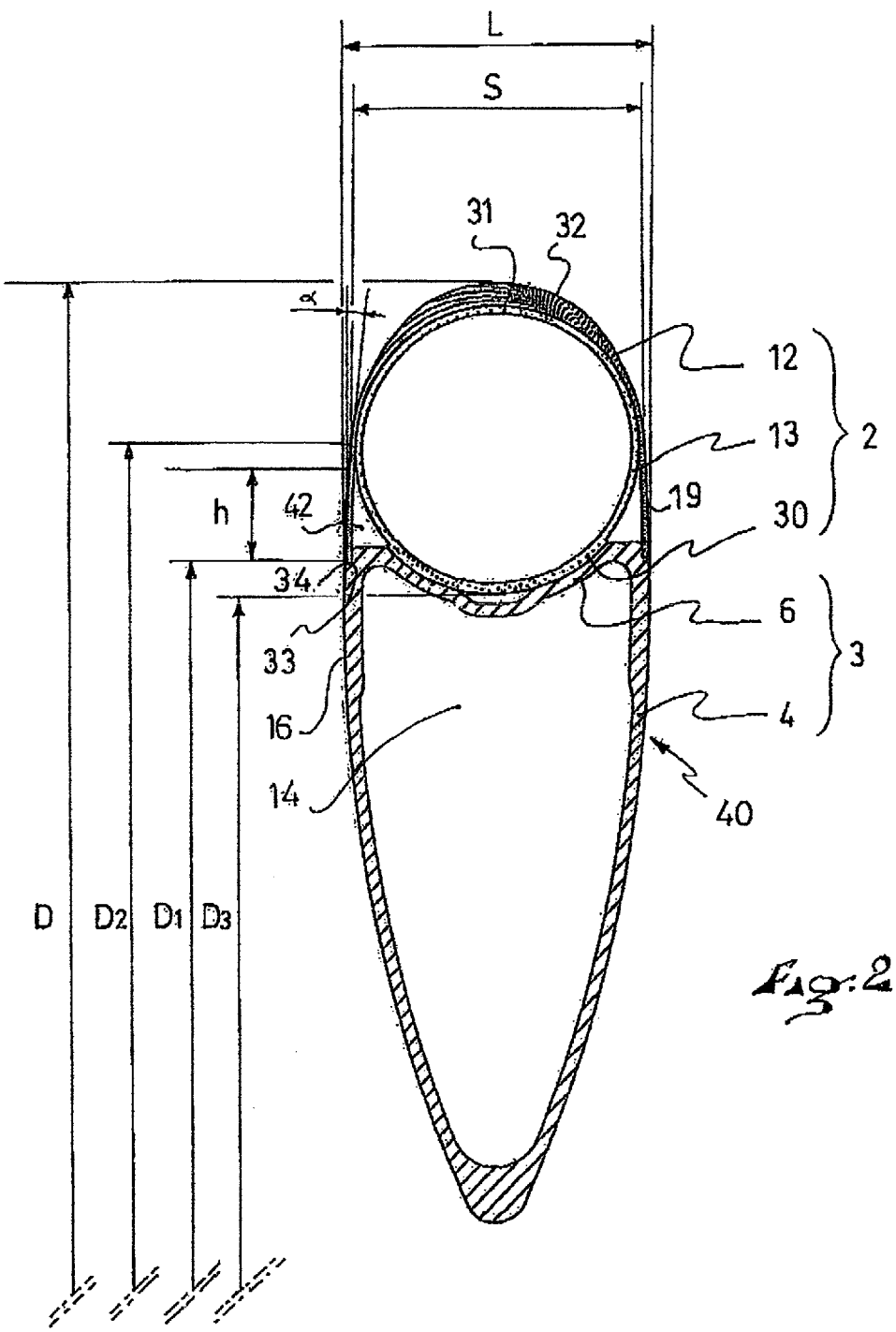
FIG. 2 is a partial cross section of the wheel of FIG. 1.

FIG. 2 shows the partial profile of the wheel, i.e., a partial cross section of the wheel, according to a first embodiment of the invention. This is a wheel having a total diameter D ranging between 600 mm and 680 mm. The rim 3 comprises a main portion 4 and a peripheral portion 6 adapted to receive the tire 2. The main portion 4 and the peripheral portion 6 of the rim, in this example, are the lower portion and upper portion, respectively, of the body 40, as viewed in FIG. 2. The peripheral portion 6 defines an annular cavity adapted to receive the tire.

The wheel includes an inflatable tire 2 of the tubular type, i.e., the tire has an inflatable interior. That is, in contrast with the embodiment shown in FIG. 6, described below, the tire is non-beaded. The tire rests on the bottom of the annular cavity. The diameter of the bottom of the annular cavity is referred to as the resting diameter D3 of the tire. The diameter D3 also corresponds to the inner diameter of the tube when mounted on the rim. The tire is fixed to the peripheral portion of the rim by gluing, i.e., by means of an adhesive. The portion of the tire that is adhered to the rim is referred to as the base 30 of the tire. The tire includes a tread 12, structured and arranged to come in contact with the ground (such as a road or a track). The tread 12 and the base 30 are separated by sides 13. In cross section, the external shape of the tire is substantially circular. When in an inflated state, the tire has a width S that is equal to 23 mm±0.5. Tires having different dimensions could be used, in particular tires whose width ranges between 18 mm and 25 mm.

The body 40 includes a hollow casing 14, whose periphery constitutes the peripheral portion 6 of the rim 3. The outer diameter of the rim is that of one of the values recommended by the ETRTO standard. In this example, this diameter is equal to 633 mm.

The side walls 16 of the rim are two truncated surfaces positioned on respective sides of the rim and which, with the plane of symmetry P of the wheel, form a relatively small angle, for example 2°. When the wheel is mounted on a bicycle and is in the braking phase, these side walls of the rim are in contact with the brake pads. Of course, this is a non-limiting characteristic of the invention; indeed, these lateral surfaces can be made to be coplanar with the plane of symmetry, or the invention can be implemented for disc brake wheels not requiring a particular configuration of the side walls of the rim.

The tire 2 includes a carcass 31 comprised, in a known manner, of the following: a panel whose two edges are sewn to each other; a sealing strip adhered onto the seam and positioned in the area of the base 30 of the tire; and an inner tube. These construction details are not shown in FIG. 2.

The tire includes a tread 12 fixed onto the carcass 31, in the area that is structured and arranged to come in contact with the ground. The tread is made out of a ply 32 having a larger size than the tread, and the edges of which are not adhered to the carcass 31. The edges of the ply 32 constitute, on each side, a lip 19 that projects from the upper portion of the sides 13 of the tire.

The height h of the lip 19, defined as being the length of the edge regions of the ply that are not adhered to carcass 31, is greater than 15% of the value of the width S of the tire. In this example, this height h is equal to 7.7 mm.

The length of the lip is such that its inner diameter D1 is greater than the resting diameter of D3. The lips are structured and arranged such that, in an in-use position, the lips are spaced apart and out of engagement with one another, as can be seen in the drawing.

The width L of the peripheral portion of the rim is a value close to the width S of the tire, in a proportion ranging between 85% and 115%. In a particular embodiment, for the purpose of decreasing aerodynamic resistance to the maximum, a rim is chosen whose width is greater than the width of the tire in a proportion ranging between 101% and 110%.

The free end of each of the lips 19, i.e., the lower end thereof, rests in a housing 33 arranged in the flanges 37. Each of the housings is shown to be axially outwardly open to receive the lips 19 and, as shown in the drawings, each of the free ends of the lips is laterally exposed. The flanges 37 of the rim are the two upstanding ridges on each side of the peripheral portion of the rim 3 as shown, e.g., in the cross section of FIG. 2. Each of the free ends 34 of the lips 19 is connected to the rim by gluing, i.e., with an adhesive. These lips can be designed so as to be pre-stressed on the flanges 37 of the rim when the tube is inflated.

The lips 19 ensure a "tensioned" connection between the tire and the rim. Indeed, the material of the ply 32 is selected to have sufficient rigidity so that, once in position, the radius of curvature of the profile in radial direction that it defines is always greater than the width S of the tire.

Because the lips 19 project from the sides 13 of the tire in the vicinity of the tread 12, it can be said that the lips 19 extend the tread from the zones having the greatest width of the tire, i.e., zones in which the tire reaches the width S. Furthermore, because the width S is close to the width of the rim, the lips 19, which connect to zones of similar widths, constitute portions of the outer surface of the wheel that are substantially coplanar with the plane of symmetry. To be precise, reference should be made to a truncated surface, but these surfaces have angles at the top that are greater than 160°. In FIG. 2, this corresponds to an angle α less than 10°.

When the tire is positioned on the rim, the lip 19 is separated from the portion of the tire that is subjacent therewith in order to define an empty space 42 between the lip 19 and the remainder of the tire. Due to this empty space 42, the lip 19 does not hinder the deformation of the tire when, during passage over an obstacle, the latter must be compressed locally.

In cross section, the three sides of the triangular hollow space 42 are the upper surface of the rim, the inner surface of the lip 19, and the surface of the portion of the tire which is subjacent with the lip 19, respectively. This triangular shape optimizes the volume of the empty space 42 in order to make the tire the lightest possible.

Figure 3:
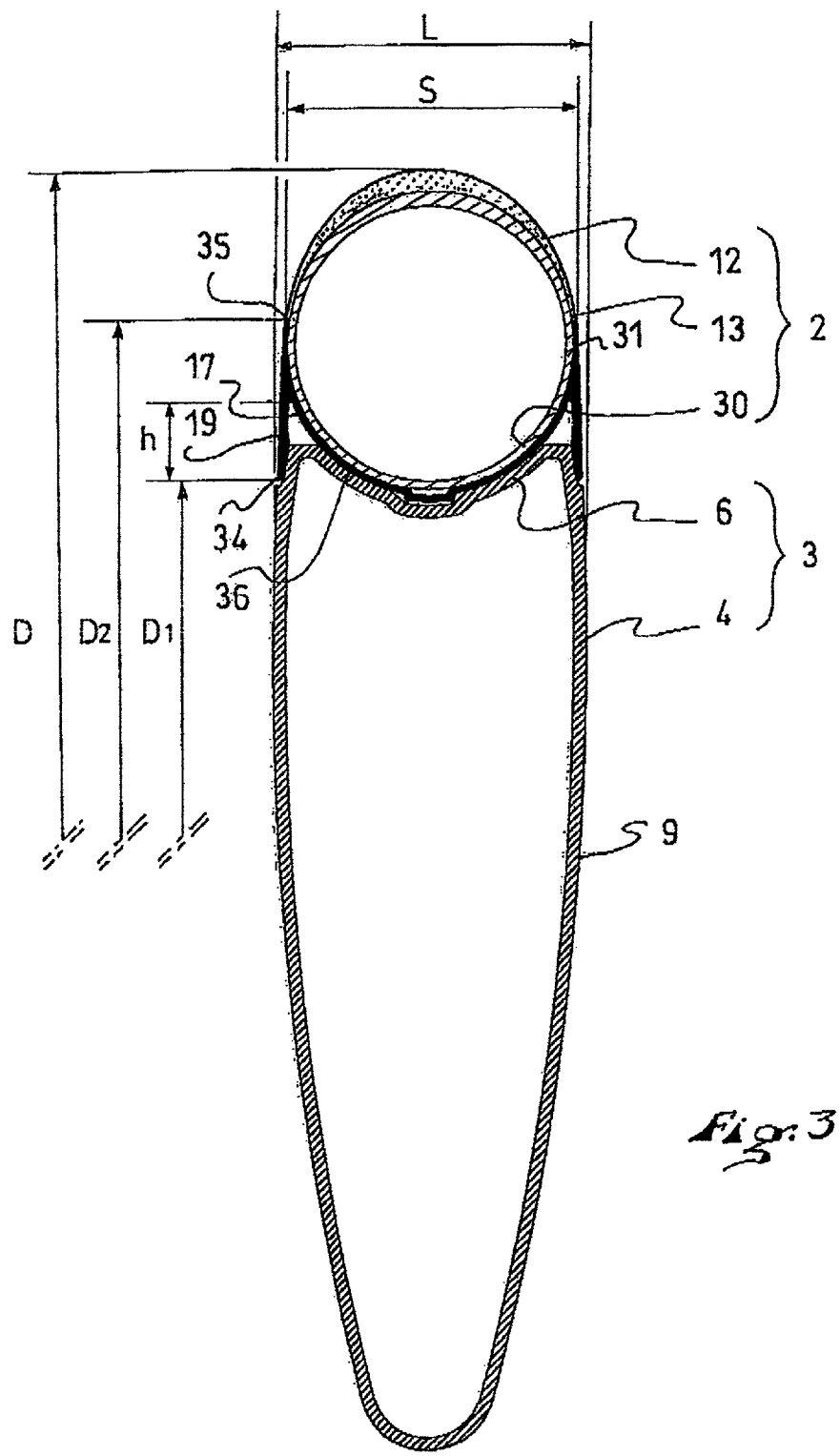
FIG. 3 is a partial cross section of a wheel according to a second embodiment of the invention.

FIG. 3 shows a partial cross section of a second embodiment of the invention, in which the lips 19 are arranged on an intermediate element, referred as the ring 17 in the following description.

In this embodiment, the rim is identical to the embodiment described above and is not further described.

The tire is substantially different. Again, this is a tire of the tubular type that includes a carcass 31, a tread 12, and a ring 17.

Figure 4:
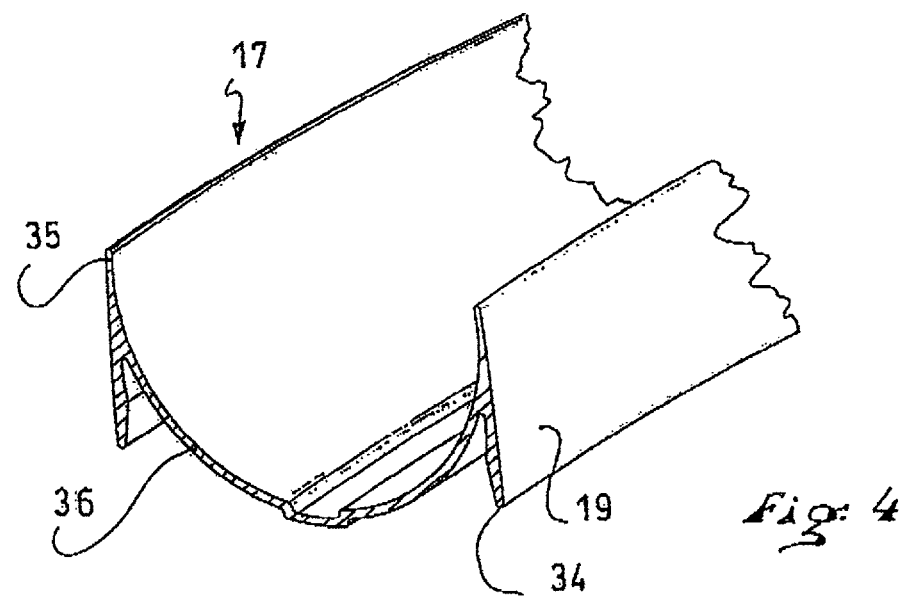
FIG. 4 is a partial perspective view of one of the components of the wheel of FIG. 3.

As shown in FIG. 4, the ring 17 is a rotational element having an axis A. It includes an annular channel 36, forming a recess open towards the periphery of the ring. When the ring is assembled to the carcass 31, the channel 36 constitutes a base 30 and sides 13, or at least a large proportion thereof, of the tire. The ring is adhered to the carcass 31, at least in the area of the base 30. In a particular embodiment, in order to affix the ring 17 to the remainder of the tire more efficiently, the entire area of the inner surface of the channel is adhered to the base 30 and to the lower portions of the sides 13.

On each side, a lip 19 projects from the channel 36 to join the rim 3 via its free end 34.

Each of the lips 19 constitute a flexible annular portion whose inner end, i.e., the free end 34, is capable of moving along a direction substantially oriented along the axis A. The flexional deformation is made possible in particular by the fact that the height h of each of the lips 19 is greater than its thickness e and, in particular, greater than two times the thickness and, in a particular embodiment, greater than three times the thickness e.

For reasons of lightness of the wheel, in an advantageous embodiment, the thickness e is as low as 20% of the height h.

The lip 19, whose height h is measured from the location in which it separates from the channel 36 to the free end 34, is greater than 15% of the value S and, in this example, measures approximately 6.4 mm. In the illustrated examples, the thickness of each of the lips is substantially constant over its entire height. However, a lip having a cross section that thins down from its anchoring zone on the sides to its free end is also contemplated by the invention. In order to have a significant mean value, the thickness e is measured in the middle of the lip 19. In the case shown, the thickness e measures approximately 0.4 mm.

Figure 5:
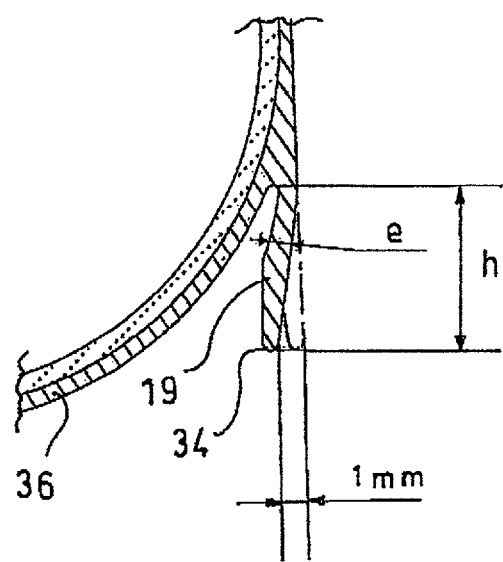
FIG. 5 is a partial cross section of the tire of the wheel of FIG. 3.

FIG. 5 shows a detailed view of the tire prior to being mounted on the rim. From the position of the lip 19 after assembly on the rim, as shown in broken lines, it is to be understood that, when the tire is mounted on the rim, the lips 19 are pre-stressed to come and rest against the flanges of the rim in order to ensure contact between the lips and the rim. In this example, a 1 mm pre-stressing of the free end 34 of the lip is provided. The pre-stressing of the lips has an effect on the improvement of the aerodynamics. Indeed, if there were separation, disturbances in the flow would generate a drag increase.

The ring 17 is made of a plastic material, for example thermoplastic elastomer (TPE) or polyether block amide (PEBA) having a modulus of elasticity less than 1000 MPa. Materials that can be used to make the ring 17 include, in a non-limiting way, Pebax®, Hytrel®, Keflex®. The material selected and the shape of the ring promote its elastic deformation. The deformable characteristic of the ring is used when the tire is positioned on the rim, on the one hand, and in order not to hinder the deformation of the tire during the use of the wheel, on the other hand. During a very strong compression of the tire, in which the portion of the tire subject to impact is crushed and flattened completely, could cause a substantial deformation of the ring 17, for example a spacing of the lips 19, without irreversible damage to the ring.

The ring 17, according to the invention, can be made of two or more materials, for example one material for the channel and another for the lips.

In a wheel according to the invention, the outer surface, i.e., the surface of the wheel that is in contact with the air-flow, is comprised of the tread 12, the upper portion of the sides 13, the outer surfaces of the ring 17, and the outer walls of the main portion 4 of the rim. The ring 17, which constitutes the interface between the tire and the rim, represents a considerable portion of this outer surface. Indeed, the ring 17 extends radially from the free end 34 of the lip 19, i.e., the radial inner end of the lip, located on a circle having a diameter D1, to the end periphery 35 of the channel 36, located on a circle having a diameter D2. The radial outer end of the lip 19 merges with the channel, as shown in FIG. 5, for example. In this way, the lips 19 are distinct from the remainder of the tire, but are fixed to the remainder of the tire. The diameter D1 corresponds to a value slightly less than the standardized diameter of the rim as recommended by the ETRTO, whereas the diameter D2 is relatively substantial because it is greater than the total diameter D of the wheel, decreased by four thirds of the width S of the tire: D2>D−(4/3)×S.

Figure 6:
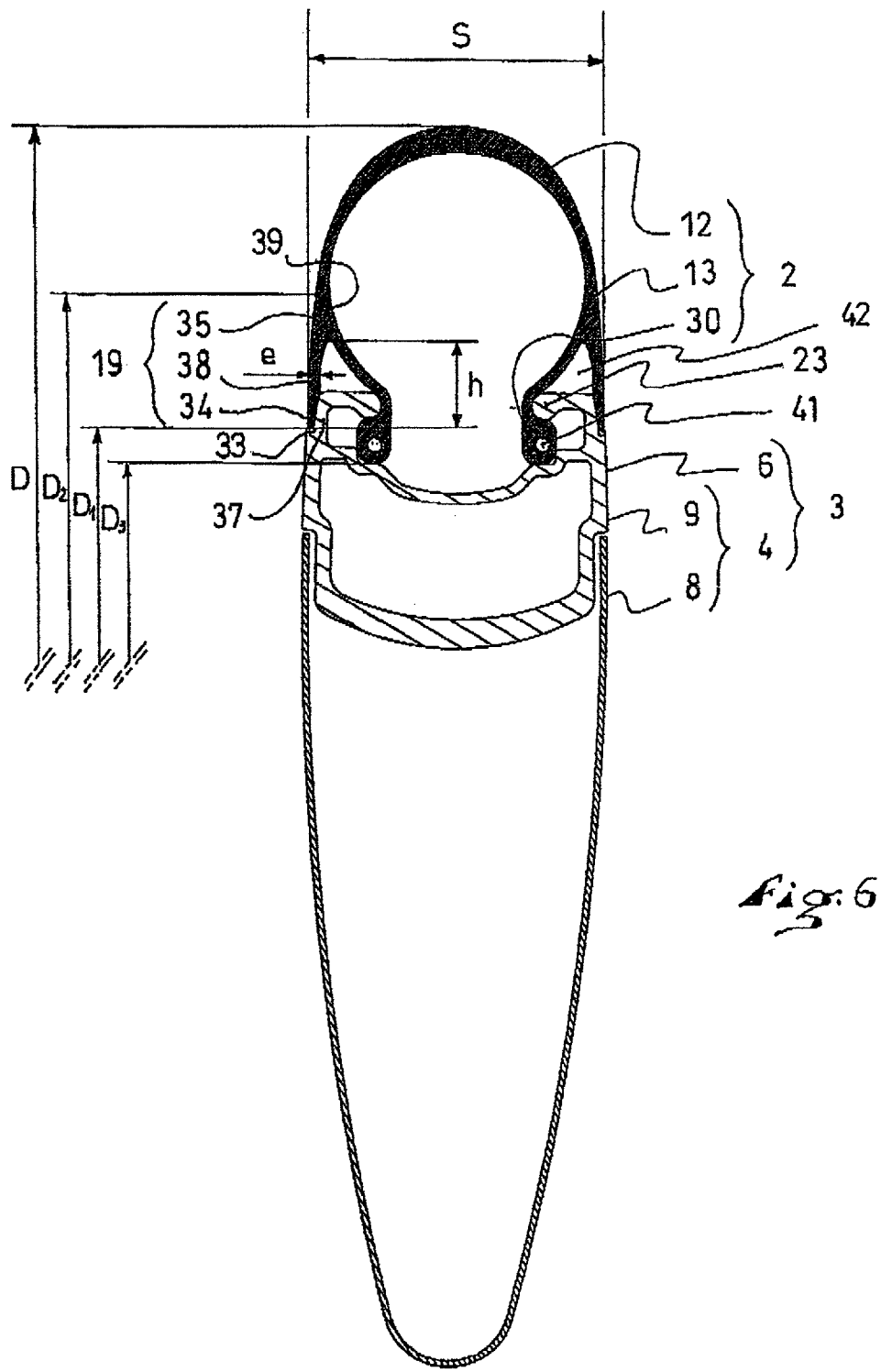
FIG. 6 is a partial cross section of a wheel according to a third embodiment of the invention.

FIG. 6 shows a third exemplary embodiment of the invention. The tire 2 is a pneumatic wire bead tire, i.e., the tire has an inflatable interior. It includes a tread 12 adapted to be in contact with the ground, a base 30, adapted to fix the tire to the rim, and the sides 13 connecting the tread 12 to the base 30.

Unlike the preceding embodiments, the base 30 here is comprised of two beads each including a stiffening wire 41. The beads, reinforced by the wires, are retained at the peripheral portion of the rim by axially inwardly projecting lips or hooks 23.

The two beads rest in the seats of the rim. The diameter of the seats is referred to as the resting diameter D3. In the illustrated non-limiting example, the diameter D3 is equal to 622 mm. The diameter D3 is also one of the dimensions which, with the width S of the tire, are used to identify the tire in accordance with the ISO standard. The resting diameter D3 is also called the inner diameter of the tire. The inner diameter D1 of the lip 19 is greater than the resting diameter D3 of the tire. Thus, the lip 19 does not hinder the braking of the wheel, when carried out with pads rubbing on the rim.

The tire could possibly be equipped with a separate tube, according to the invention.

According to the invention, each of the lips 19 projects radially inward on each side of the tire, i.e., toward the axis A. The lip 19 is attached to the tire via its anchoring zone 39 and is extended to come in contact with the flange 37 of the rim via its free end 34. The height h of the lip, defined between the anchoring zone 39 and the free end 34, is greater than 15% of the width S of the tire. In an alternative embodiment, the height h of the lip is greater than 25% of the width of the tire. The thickness e of the lip, measured in the median portion 38 thereof, is less than one-half of the height h. In an alternative embodiment, the thickness e of the lip is less than one-third of the height h.

As in the first embodiment, the lips 19 can be constituted by the extension of the tread 12, or of a material distinct from that of the tread and fixed to the remainder of the tire during manufacture. That is, the lips 19 can be either made in one-piece with the remainder of the tire or each of the lips 19 is distinct from and is fixed to the remainder of the tire.

The configuration of the lips is calculated such that they are pre-stressed in order to be pressed against the flanges of the rim. To ensure a better continuity of the outer surface of the wheel, the free end 34 of each of the lips 19 is received in a housing 33 arranged in a flange 37 of the rim.

The rim 3 comprises a main portion 4 and a peripheral portion 6, adapted to receive the tire 2. The main portion 4 of the rim is comprised of the lower portion of an aluminum profile element 9 and a flange 8 made of composite material and adhered on the lower portion of the side walls of the profile element 9.

Compared to a wheel equipped with a conventional bead tire, the tire according to the invention comprises an interface fitting that fills the tire/rim interface zone. The interface fitting is comprised of the lip 19 from its anchoring zone 39 to its free end 34. The interface fitting represents a considerable proportion of the outer surface of the wheel. Indeed, it constitutes an annular surface demarcated by a circle having a diameter D1 (free end 34 of the lip 19) and by a circle D2 (anchoring zone 39 of the lip). The diameter D1 corresponds to a value slightly less than the standardized diameter value of the rim according to the ETRTO, whereas the diameter D2 is greater than the total diameter D of the wheel, decreased by four thirds of the width S of the tire: D2>D−(4/3)×S.

The invention illustratively disclosed herein, suitably may be practiced in the absence of any element which is not specifically disclosed herein.

The invention claimed is:

1. A cycle wheel comprising:
a rotational axis;
a diameter;
a cycle rim;
a tire comprising:
    a substantially toroidal shape;
    a tread comprising a ground-engaging surface during use of the tire;
    a base adapted to be fixed upon a peripheral portion of the cycle rim;
    two sides connecting the tread and the base;
    a lip projecting radially inward from each of respective ones of the two sides of the tire to a respective free end, the lip having a height and a thickness, the height being greater than twice the thickness, the lip projecting from an upper portion of the side, proximate the tread;
the cycle rim comprising a rotational body, the rotational body comprising:
    a cross section having a main portion;
    the peripheral portion having a radially outwardly facing surface;
    an annular recess structured and arranged to at least partially receive the tire;
the wheel further comprising an outer surface, the outer surface comprising portions of the tire and portions of the cycle rim facing outward of the wheel;
the main portion of the cross section of the cycle rim having a width greater than the width of the tire when the tire is in an inflated state;
each said lip of the tire having a height greater than 15% of the width of the tire;
the free end of each of the lips of the respective ones of the two sides of the tire is laterally exposed.

2. A cycle wheel according to claim 1, wherein:
an empty space is defined by an upper surface of the cycle rim, the lip, and a portion of the tire subjacent with the lip.

3. A cycle wheel according to claim 1, wherein:
each said lip constitutes an intermediate portion of the outer surface of the wheel;
each said lip extends substantially between an inner circle, having an axis A and a diameter D1, and an outer circle having an axis A and a diameter D2, said diameter D2 being greater than a total diameter D of the wheel decreased by four-thirds of the value of the tire width S: D2>D−(4/3)×S.

4. A cycle wheel according to claim 1, wherein:
each said lip has a cross-sectional profile forming a curve portion, the curve portion having a radius of curvature always greater than the width of the tire.

5. A cycle wheel according to claim 1, wherein:
each of the lips of the tire is in tensioned engagement with the cycle rim.

6. A cycle wheel according to claim 1, wherein:
the cycle rim comprises a pair of housings, each of the housings receiving a respective one of the free ends of the lips of the tire.

7. A cycle wheel according to claim 6, wherein:
each of the pair of housings is axially outwardly open.

8. A cycle wheel according to claim 1, wherein:
each said lip of the tire is in contact with the cycle rim.

9. A cycle wheel comprising:
a rotational axis;
a diameter;
a cycle rim;
a tire comprising:
　a substantially toroidal shape;
　a tread comprising a ground-engaging surface during use of the tire;
　a base adapted to be fixed upon a peripheral portion of the cycle rim;
　two sides connecting the tread and the base;
　a lip projecting radially inward from each of respective ones of the two sides of the tire to a respective free end, the lip having a height and a thickness, the height being greater than twice the thickness, the lip projecting from an upper portion of the side, proximate the tread;
the cycle rim comprising a rotational body, the rotational body comprising:
　a cross section having a main portion;
　the peripheral portion having a radially outwardly facing surface;
　an annular recess structured and arranged to at least partially receive the tire;
the wheel further comprising an outer surface, the outer surface comprising portions of the tire and portions of the cycle rim facing outward of the wheel;
the main portion of the cross section of the cycle rim having a width greater than the width of the tire when the tire is in an inflated state;
each said lip of the tire having a height greater than 15% of the width of the tire;
the wheel further comprising:
a hub;
a plurality of spokes, each of the spokes having a body extending between the cycle rim and the hub;
a portion of each of the bodies of the spokes extending radially inward of the rim and radially outward of the hub being exposed to contact with air flow during use of the wheel.

10. A cycle wheel according to claim 9, wherein:
each said lip of the tire is in contact with the cycle rim.

11. A cycle wheel comprising:
a rotational axis;
a diameter;
a cycle rim;
a hub;
a plurality of spokes, each of the plurality of spokes having a body extending between the rim and the hub, a portion of each of the bodies of the spokes extending radially inward of the rim and radially outward of the hub being exposed to contact with air flow during use of the wheel;
a tire comprising:
　a substantially toroidal shape;
　a tread comprising a ground-engaging surface during use of the tire;
　a base adapted to be fixed upon a peripheral portion of the cycle rim;
　two sides connecting the tread and the base;
　a lip projecting from each of respective ones of the two sides, the lip having a height and a thickness, the height being greater than twice the thickness, the lip projecting from an upper portion of the side, proximate the tread;
the cycle rim comprising a rotational body, the rotational body comprising:
　a cross section having a main portion;
　the peripheral portion having a radially outwardly facing surface;
　an annular recess structured and arranged to at least partially receive the tire;
the wheel further comprising an outer surface, the outer surface comprising portions of the tire and portions of the rim facing outward of the wheel;
the main portion of the cross section of the cycle rim having a width greater than the width of the tire when the tire is in an inflated state;
each said lip of the tire having a height greater than 15% of the width of the tire.

12. A cycle wheel according to claim 11, wherein:
the cross section of the main portion of the rim having a radially innermost end radially spaced from the hub.

\* \* \* \* \*